US009903766B2

(12) United States Patent
Leow et al.

(10) Patent No.: US 9,903,766 B2
(45) Date of Patent: Feb. 27, 2018

(54) REMOTE TEMPERATURE SENSING

(71) Applicant: Infineon Technologies AG, Neubiberg (DE)

(72) Inventors: Yoon Hwee Leow, Singapore (SG);
Kwan Siong Choong, Singapore (SG);
Cheow Guan Lim, Singapore (SG);
Chin Yeong Koh, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 242 days.

(21) Appl. No.: 14/954,647

(22) Filed: Nov. 30, 2015

(65) Prior Publication Data
US 2017/0153149 A1    Jun. 1, 2017

(51) Int. Cl.
*G01K 7/00*  (2006.01)
*G01K 7/16*  (2006.01)
*G01K 7/24*  (2006.01)

(52) U.S. Cl.
CPC   *G01K 7/16* (2013.01); *G01K 7/24* (2013.01)

(58) Field of Classification Search
USPC .................. 374/183, 100, 170, 178; 327/512
See application file for complete search history.

(56) References Cited

U.S. PATENT DOCUMENTS

| 6,111,397 | A | * | 8/2000 | Leung | G05F 3/245 323/312 |
| 7,887,235 | B2 | * | 2/2011 | Campos | G01K 3/005 327/512 |
| 8,864,377 | B2 | * | 10/2014 | Wong | G01K 7/01 327/513 |
| 2003/0123520 | A1 | * | 7/2003 | Tesi | G01K 7/01 374/178 |
| 2006/0044047 | A1 | * | 3/2006 | Porter | G01K 7/015 327/512 |
| 2006/0267668 | A1 | * | 11/2006 | Porter | G01K 7/015 327/512 |
| 2007/0290905 | A1 | | 12/2007 | Kobayashi et al. | |

(Continued)

FOREIGN PATENT DOCUMENTS

DE   102014107499 A1   12/2014
DE   102014107504 A1   12/2014

(Continued)

*Primary Examiner* — Mirellys Jagan
(74) *Attorney, Agent, or Firm* — Shumaker & Sieffert, P.A.

(57) ABSTRACT

An example method includes outputting, by a device, a first current through a temperature sensor that is that is external to the device; determining, by the device and based on a voltage drop across the temperature sensor while the first current is flowing through the temperature sensor, a current level; outputting, by the device, a second current at the determined current level through the temperature sensor; determining, by an analog-to-digital converter (ADC) of the device, a value that corresponds to a voltage drop across the temperature sensor while the second current is flowing through the temperature sensor; outputting, by the device, a third current through a reference resistor that is external to the device; and determining, based on the value and a voltage drop across the reference resistor while the third current is flowing through the reference resistor, a temperature of the temperature sensor.

19 Claims, 7 Drawing Sheets

(56) References Cited

U.S. PATENT DOCUMENTS

| | | | |
|---|---|---|---|
| 2011/0098966 A1 | 4/2011 | Suzuki | |
| 2011/0102058 A1* | 5/2011 | Conte | G05F 3/30 |
| | | | 327/512 |
| 2013/0314110 A1 | 11/2013 | McNeill et al. | |
| 2015/0338282 A1* | 11/2015 | Lim | H03M 3/458 |
| | | | 374/178 |
| 2016/0116345 A1* | 4/2016 | Furtner | G01K 7/01 |
| | | | 374/178 |

FOREIGN PATENT DOCUMENTS

| | | |
|---|---|---|
| EP | 2314996 A1 | 4/2011 |
| WO | 2014094775 A1 | 6/2014 |

* cited by examiner

REMOTE TEMPERATURE SENSING

TECHNICAL FIELD

This disclosure relates to remote temperature sensing.

BACKGROUND

The ability to accurately measure temperature may be beneficial for the operation of a device and/or system. In some examples, a device may utilize one or more remote temperature sensors to measure the temperature at one or more remote sites. Such a remote sensing system may include many potential sources of measurement error.

SUMMARY

In one example, a method includes outputting, by a device, a first current through a temperature sensor that is that is external to the device; determining, by the device and based on a voltage drop across the temperature sensor while the first current is flowing through the temperature sensor, a current level; outputting, by the device, a second current at the determined current level through the temperature sensor; determining, by an analog-to-digital converter (ADC) of the device, a value that corresponds to a voltage drop across the temperature sensor while the second current is flowing through the temperature sensor; outputting, by the device, a third current through a reference resistor that is external to the device; and determining, based on the value and a voltage drop across the reference resistor while the third current is flowing through the reference resistor, a temperature of the temperature sensor.

In another example, a device includes one or more current sources; an analog-to-digital converter (ADC); and a controller. In this example, the controller is configured to: cause the one or more current sources to output a first current through a temperature sensor that is external to the device; determine, based on a voltage drop across the temperature sensor while the first current is flowing through the temperature sensor, a current level; cause the one or more current sources to output a second current at the determined current level through the temperature sensor; cause the ADC to generate a value that corresponds to a voltage drop across the temperature sensor while the second current is flowing through the temperature sensor; cause the one or more current sources to output a third current through a reference resistor that is external to the device; and determine, based on the value and a voltage drop across the reference resistor while the third current is flowing through the reference resistor, a temperature of the temperature sensor.

In another example, a system includes a temperature sensor; a reference resistor; and a device. In this example, the device includes: one or more current sources configured to output a first current through the temperature sensor; a controller configured to determine, based on a voltage drop across the temperature sensor while the first current is flowing through the temperature sensor, a current level, wherein the one or more current sources are further configured to output a second current at the determined current level through the temperature sensor; and an analog-to-digital converter (ADC) configured to determine a value that corresponds to a voltage drop across the temperature sensor while the second current is flowing through the temperature sensor, wherein the one or more current sources are further configured to output a third current through the reference resistor, and wherein the controller is further configured to determine, based on the value and a voltage drop across the reference resistor while the third current is flowing through the reference resistor, a temperature of the temperature sensor.

Details of these and other examples are set forth in the accompanying drawings and the description below. Other features, objects, and advantages will be apparent from the description and drawings, and from the claims.

DETAILED DESCRIPTION

In general, this disclosure is directed to techniques for remote temperature sensing. In some examples, it may not be desirable to position a temperature sensor, such as a thermistor, near the device and/or system that uses the temperature sensor to determine the temperature of a remote site. For instance, when measuring a temperature of a battery, it may be desirable to position a temperature sensor on or in the battery and position the device outside of the battery. However, one or more errors may be introduced when the device and the temperature sensor are positioned separately. For instance, when the device includes a bandgap voltage generator that generates a reference voltage for an analog-to-digital converter (ADC) to convert an analog temperature signal into a digital temperature signal, the reference voltage may be temperature dependent. However, as the device is positioned remotely from the temperature sensor, the temperature of the bandgap voltage generator may be different than the temperature of the remote site, which may cause the digital temperature signal to be a function of both the temperature of the remote site and the temperature of the device. As such, it may be desirable for a device to generate a digital temperature signal that is not a function of the temperature of the device.

Figure 1:
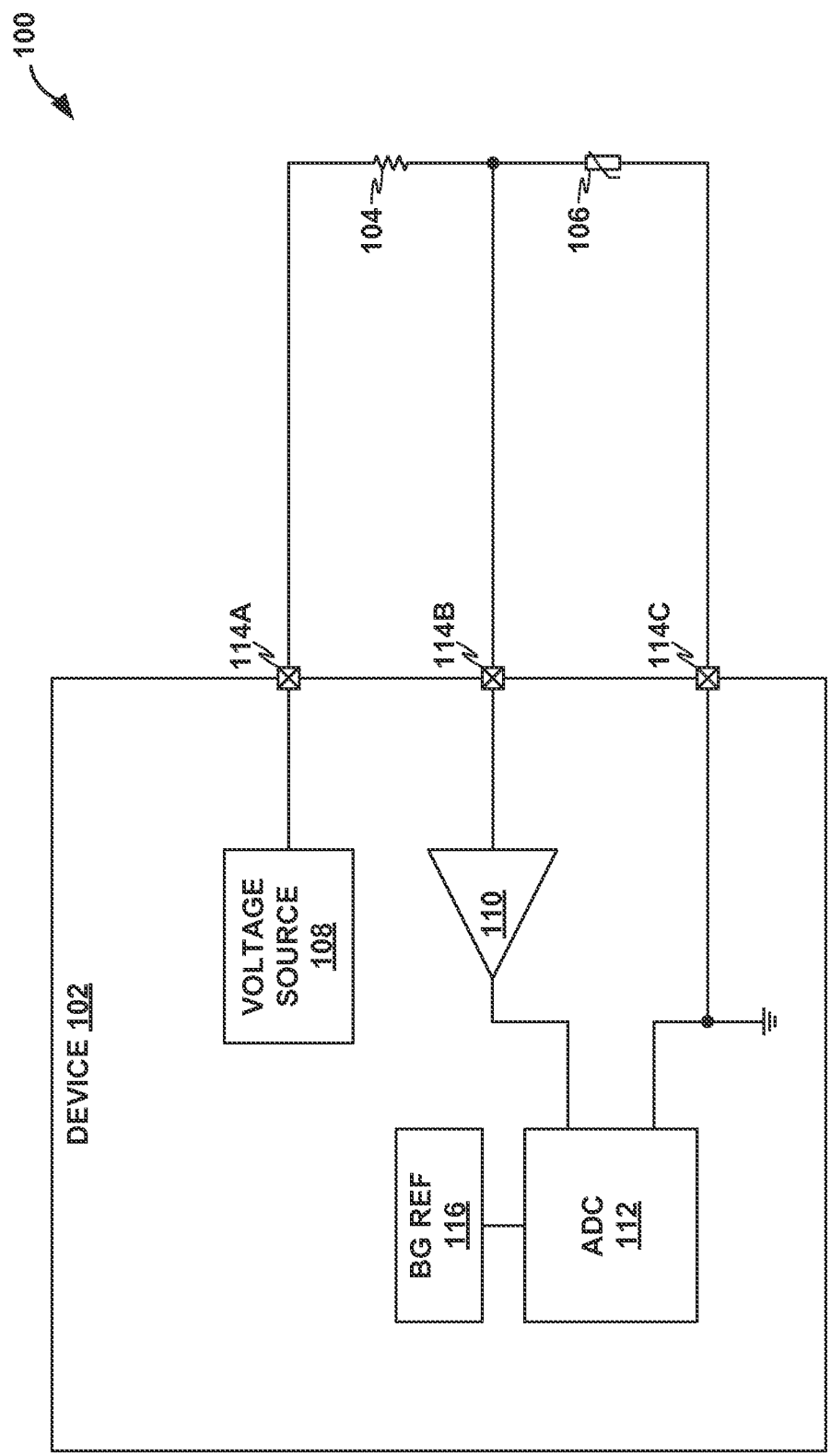
FIG. 1 is a conceptual diagram illustrating an exemplary system that includes a device for determining the temperature of a remote site.

FIG. 1 is a conceptual diagram illustrating an exemplary system that includes a device for determining the temperature of a remote site. As illustrated in the example of FIG. 1, system 100 may include device 102, resistor 104, and temperature sensor 106.

System 100 may include device 102 which may be configured to generate a digital value that represents a temperature of temperature sensor 106. As illustrated in the example of FIG. 1, device 102 may include voltage source 108, amplifier 110, analog-to-digital converter 112, connectors 114A-114C (collectively, "connectors 114"), and bandgap reference 116. Examples of device 102 include, but are not limited to, integrated circuits, chips, and dies.

Device 102, in some examples, may include connectors 114 which may be configured to conduct signals from components within device 102 to components outside of device 102. Examples of connectors 114 include, hut are not limited to, pins, plugs, pads, sockets, or any other apparatus capable of conducting signals across a device boundary.

System 100 may include temperature sensor 106 which may be configured to generate an electrical signal based on a temperature of a remote site at which temperature sensor 106 is positioned. For purposes of this disclosure, it may be assumed that the temperature of temperature sensor 106 is the same as the temperature of the remote site at which temperature sensor 106 is positioned. In some examples, the resistance of temperature sensor 106 may be a function of the temperature of temperature sensor 106. In some examples, the function of the resistance of temperature sensor 106 to the temperature of temperature sensor 106 may not be a linear function. Examples of temperature sensor 106 include thermistors, thermocouples, or any other component capable of generating an electrical signal based on a temperature.

System 100 may include resistor 104 which may be connected in series with temperature sensor 106. In this way, resistor 104 may act as a linearizing resistor for temperature sensor 106.

In operation, voltage source 108 may output a voltage via connector 114A to bias resistor 104 and temperature sensor 106. As they are in series, resistor 104 and temperature sensor 106 may form a voltage divider such that the voltage output by voltage source 108 is divided among resistor 104 and temperature sensor 106 based on their respective resistances. As the resistance of temperature sensor 106 is a function of the temperature of temperature sensor 106, the voltage drop across temperature sensor 106 may similarly be a function of the temperature of temperature sensor 106. The voltage across temperature sensor 106 may be received by device 102 via connectors 114B and 114C.

Amplifier 110 may amplify and/or buffer the received voltage signal i.e., the voltage across temperature sensor 106) and output the amplified signal to ADC 112. ADC 112 may convert, based on a reference voltage generated by bandgap reference 116, the amplified signal into a digital value that represents the temperature of temperature sensor 106. For instance, the digital value output by ADC 116 may represent the temperature in accordance with Equation (1), below, where $\mu_{ADC}$ is the duty cycle of ADC 116, $V_{ADC}$ is the voltage output by amplifier 110, $V_{ref}$ is the reference voltage generated by bandgap reference 116, $R_{th}$ is the resistance of temperature sensor 106, and $R_b$ is the resistance of resistor 104. As shown in Equation (1), the duty cycle of ADC 116 is not dependent on the reference voltage generated by bandgap reference 116. In this way, device 102 may determine the temperature of a remote site.

$$\mu_{ADC} = \frac{V_{ADC}}{V_{ref}} = \frac{V_{ref} \cdot (R_{th}/R_{th} + R_b)}{V_{ref}} \tag{1}$$

Figure 2:
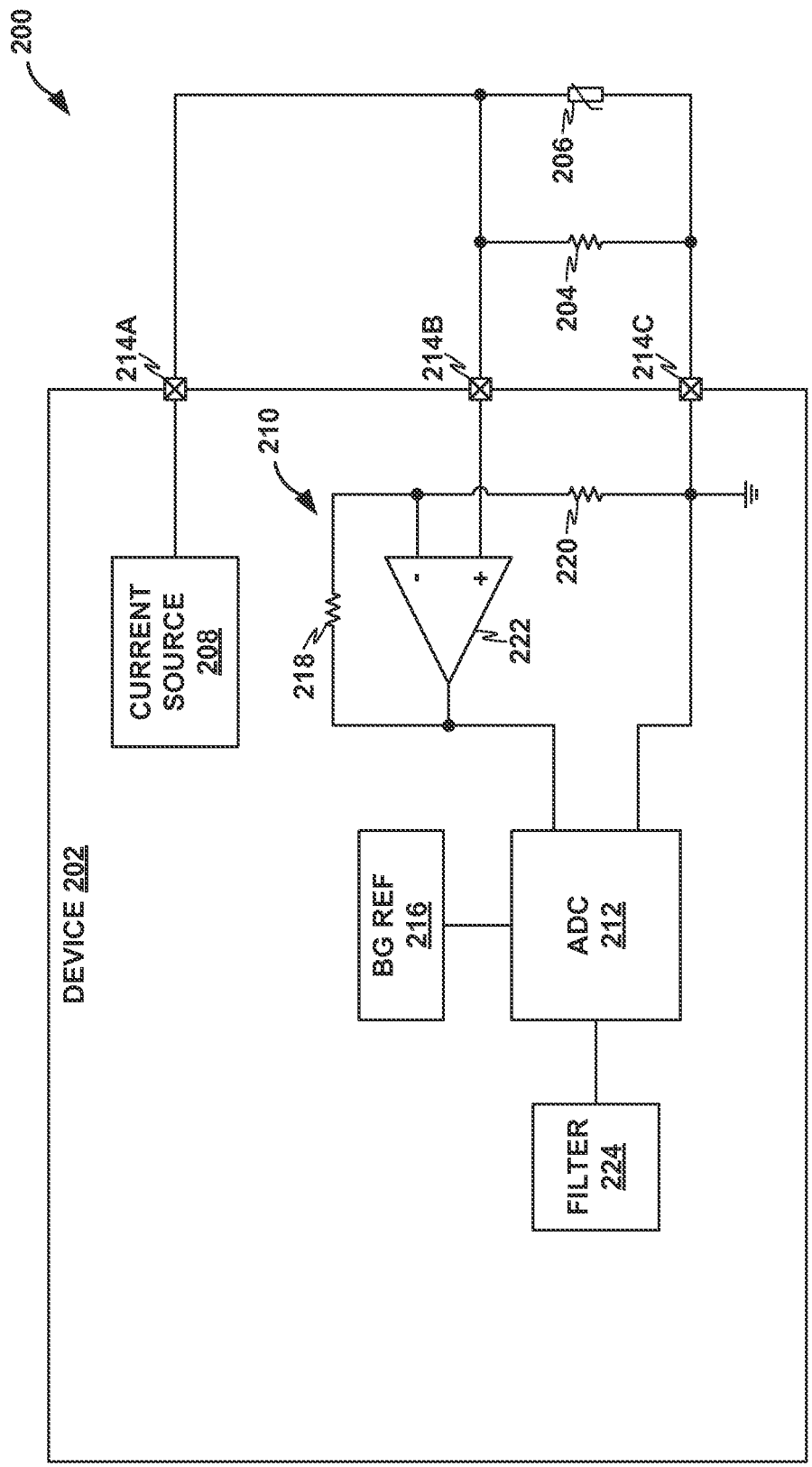
FIG. 2 is a conceptual diagram illustrating an exemplary system that includes a device for determining the temperature of a remote site.

FIG. 2 is a conceptual diagram illustrating an exemplary system that includes a device for determining the temperature of a remote site. As illustrated in the example of FIG. 2, system 200 may include device 202, resistor 204, and temperature sensor 206.

System 200 may include device 202 which may be configured to perform operations similar to device 102 of FIG. 1. For instance, device 202 may be configured to generate a digital value that represents a temperature of temperature sensor 206. However, as opposed to device 102 of system 100 that operates temperature sensor 106 in the voltage mode, device 202 may operate temperature sensor 206 in the current mode. In particular, as opposed to receiving a signal that represents the voltage across temperature sensor 206, device 202 may receive a signal that represents the amount of current flowing through temperature sensor 206. As illustrated in the example of FIG. 2, device 202 may include current source 208, amplifier 210, and analog-to-digital converter 212, connectors 214A-214C (collectively, "connectors 214"), bandgap reference 216, and filter 224. Examples of device 202 include, but are not limited to, integrated circuits, chips, and dies.

Device 202, in some examples, may include connectors 214 which may be configured to conduct signals from components within device 202 to components outside of device 202. Examples of connectors 214 include, but are not limited to, pins, plugs, pads, sockets, or any other apparatus capable of conducting signals across a device boundary.

System 200 may include temperature sensor 206 which may be configured to generate an electrical signal based on a temperature of a remote site at which temperature sensor 206 is positioned. For purposes of this disclosure, it may be assumed that the temperature of temperature sensor 206 is the same as the temperature of the remote site at which temperature sensor 206 is positioned. In some examples, the resistance of temperature sensor 206 may be a function of the temperature of temperature sensor 206. In some examples, the function of the resistance of temperature sensor 206 to the temperature of temperature sensor 206 may not be a linear function. Examples of temperature sensor 206 include thermistors, thermocouples, or any other component capable of generating an electrical signal based on a temperature.

System 200 may include resistor 204 which may be connected in parallel with temperature sensor 206. In this way, resistor 204 may act as a linearizing resistor for temperature sensor 206.

In some examples, system 200 may include one or more components not illustrated in FIG. 2. For instance, system 200 may include a low-pass filter configured to filter the signal received at connector 214B.

In operation, current source 208 may output a current via connector 214A to flow through resistor 204 and temperature sensor 206. As they are in parallel, resistor 204 and temperature sensor 206 may form a current divider such that the current output by current source 208 is divided among resistor 204 and temperature sensor 206 based on their respective resistances. As the resistance of temperature sensor 206 is a function of the temperature of temperature sensor 206, the amount of current flowing through temperature sensor 206 may similarly be a function of the temperature of temperature sensor 206. Therefore, the voltage across resistor 204 and temperature sensor 206 may similarly be a function of the temperature of temperature sensor 206. The voltage across temperature sensor 206 and resistor 204 may be received by device 202 via connectors 214B and 214C.

Amplifier 210 may amplify and/or buffer the received voltage signal (i.e., the voltage across temperature sensor 206 and resistor 204) and output the amplified signal to ADC 212. As shown in the example of FIG. 2, amplifier 210 may be a non-inverting amplifier that includes resistors 218 and 220 along with op-amp 222.

In any case, ADC 212 may convert, based on a reference voltage generated by bandgap reference 216, the amplified signal into a digital value that represents the temperature of temperature sensor 206. In some examples, the generated digital value that represents the temperature of temperature sensor 206 (i.e., the duty cycle of ADC 216) may not be dependent on the reference voltage generated by bandgap reference 216. In this way, device 202 may determine the temperature of a remote site.

As shown in FIG. 2, in some examples, filter 224 may filter the signal output by ADC 212. For instance, filter 224 may be a decimation filter that reduces the effective sampling rate.

As stated above, systems 100 and 200 are able to generate a digital value that represents the temperature at a remote site that is not dependent on a reference voltage generated by a bandgap reference. However, systems 100 and 200 may present one or more disadvantages.

As one example, the current consumption of systems 100 and 200 is temperature dependent as the resistance of the temperature sensor 106/206 changes. Where the temperature sensor is a negatively temperature correlated (NTC) temperature sensor, the resistance of the temperature sensor increases at high temperatures, which results in a higher current consumption at high temperatures. Since the resistance of the temperature sensor can be rather small when heated up, the current required from voltage source 108 has to be rather large. In addition to the high current consumed, the highly non-linear nature of the temperature sensor thermal characteristics may cause voltage source 108 to supply a current with a high dynamic range of magnitude. The current mode system 200 may suffer from similar disadvantages.

Additionally, in some examples, it may not be desirable to bias the temperature sensor at the same level when measuring temperatures across a wide range. In particular, if a particular level (i.e., either a current level or a voltage level) is used to bias the temperature sensor when measuring temperatures across a wide range, the resulting signal generated by the temperature sensor may not utilize the input dynamic range of the ADC (i.e., where the temperature sensor has a logarithmic thermal characteristic), which may reduce measurement accuracy.

In accordance with one or more techniques of this disclosure, as opposed to biasing a remote temperature sensor at a constant level (e.g., a constant voltage level or a constant current level), a device may determine the temperature of a remote temperature sensor while the remote temperature sensor is biased at a level determined based on a coarse measurement of the temperature of the remote temperature sensor. For instance, the device may bias the remote temperature sensor at a first current level, determine a second current level based on the voltage across the remote temperature sensor while the remote temperature sensor is biased at the first current level, and determine the temperature of the remote temperature sensor while the remote temperature sensor is biased at the determined current level. In this way, the device may reduce the amount of current consumed by the remote temperature sensor. Also in this way, the device may cause the temperature sensor to generate a signal that more fully utilizes the dynamic range of the ADC.

In some examples, it may be desirable for a single device to use multiple temperature sensors to determine temperatures at multiple remote sites. In other words, it may be desirable for a single device to control a plurality of remote temperature sensors. Additionally, it may desirable to for the device to have a minimum number of connectors. As such, it may be desirable for a single device to be capable of sensing temperatures at a plurality of remote sites with a minimum number of connectors.

However, in some examples, the voltage mode system 100 and the current mode system 200 may not suitable for multiple sensing applications (i.e., sensing the temperature at a plurality of remote sites using a plurality of temperature sensors). In particular, because voltage mode system 100 may have to multiplex among a number of remote sensing sites for both the biasing voltage (i.e., as output by voltage source 108) and the sensing thermistor, each additional sensing site may require two additional connectors. For example, the number of connectors required for N remote sensing sites with thermistors may require 2N+1 connectors, where the last connector may be included for sensing the remote ground. The current mode system 200 may suffer from similar disadvantages. As such, the actual bill-of-materials (BOM) cost for either the voltage mode system 100 or current mode system 200 may multiply if multiple remote sensing sites are required due to the necessity of an additional linearizing resistor for each added thermistor.

Additionally, in some examples, the reference voltage (i.e., bandgap references 116 and 216) used by the ADC may introduce error into the temperature measurement. As such, it may be desirable for a device to determine the temperature at a remote sensing site that is not affected by a reference voltage source.

In accordance with one or more techniques of this disclosure, a device may be capable of sensing the temperature for N remote sensing sites with fewer than 2N+1 connectors. For instance, a system that includes the device may include a single reference resistor regardless of the number of remote temperature sensors. In some examples, the reference resistor may not be connected to any of the remote temperature sensors (i.e., the reference resistor may not be in series or parallel with any of the remote temperature sensors). As such, as opposed to functioning as a linearizing resistor for the remote temperature sensors, the reference resistor may function to remove the dependency of the temperature measurement on a bandgap reference voltage. In this way, the device may shift the error (i.e., from the reference voltage source) to the tolerance and temperature dependency of the reference resistor, which, in some examples, may be easier to control.

Figure 3:
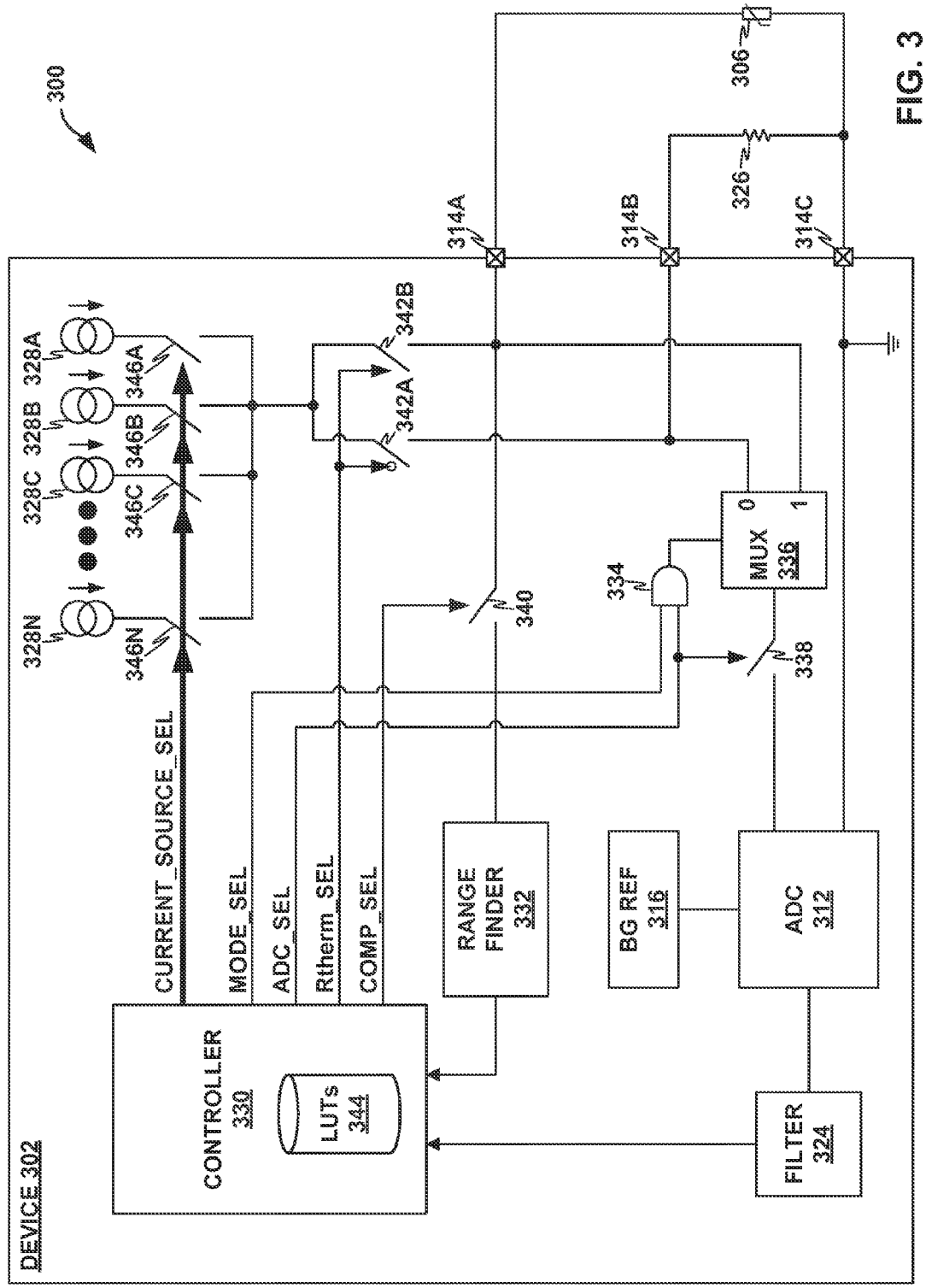
FIG. 3 is a conceptual diagram illustrating an exemplary system that includes a device for determining the temperature of a remote site, in accordance with one or more techniques of this disclosure.

FIG. 3 is a conceptual diagram illustrating an exemplary system that includes a device for determining the temperature of a remote site, in accordance with one or more techniques of this disclosure. As illustrated in the example of FIG. 3, system 300 may include device 302, resistor 326, and temperature sensor 306.

System 300 may include device 302 which may be configured to generate a digital value that represents a temperature of temperature sensor 306. As illustrated in the example of FIG. 3, device 302 may include analog-to-digital converter 312, connectors 314A-314C (collectively, "connectors 314"), bandgap reference 316, filter 324, current sources 328A-328N (collectively, "current sources 328"), controller 330, range finder 332, AND gate 334, multiplexer 336, switch 338, switch 340, switches 342A and 342B (collectively, "switches 342"), and switches 346A-346N (collectively, "switches 34"). Examples of device 302 include, but are not limited to, integrated circuits, chips, and dies.

Device 302, in some examples, may include current sources 328 which may be configured to output current. In some examples, current sources of current sources 328 may be configured to output current levels at integer multiples of each other. For instance, current source 328A may be configured to output current at M amps, current source 328B may be configured to output current at 2*M amps, current sources 328C may be configured to output current at 3*M amps, and current source 328N may be configured to output current at M*N amps.

Device 302, in some examples, may include switches 346, each of which may be configured to couple a current source of current sources 328 to one or more other components of device 302, such as switches 342. For instance, switch 346A may be configured to connect current source 328A to switches 342, switch 346B may be configured to connect current source 328B to switches 342, switch 346C may be configured to connect current source 328C to switches 342, and switch 346N may be configured to connect current source 328N to switches 342.

Device 302, in some examples, may include controller 330, which may be configured to perform one or more operations to control device 302 to determine a temperature of an external temperature sensor, such as temperature sensor 306. For instance, controller 330 may output signals that cause one or more components of device 302 to perform one or more operations. In some examples, controller 330 may include one or more look-up-tables (LUTs) 344 which may include mappings of resistances of temperature sensor 306 to resistances of temperature sensor 306. Examples of controller 330 include, but are not limited to, one or more processors, including, one or more microprocessors, digital signal processors (DSPs), application specific integrated circuits (ASICs), field programmable gate arrays (FPGAs), or any other equivalent integrated or discrete logic circuitry, as well as any combinations of such components.

Device 302 may include ADC 312 which may be configured to convert an analog level into a digital value. In some examples, ADC 312 may perform the conversion based on a reference voltage, such as a reference voltage received from BG reference 316. In some examples, ADC 312 may comprise a sigma-delta ADC.

Device 302 may include filter 324 which may be configured to filter values generated by ADC 312. For instance, filter 324 may include a decimation filter configured to filter values generated by ADC 312 for processing by controller 330.

Device 302, in some examples, may include connectors 314 which may be configured to conduct signals from components within device 302 to components outside of device 302. Examples of connectors 314 include, but are not limited to, pins, plugs, pads, sockets, or any other apparatus capable of conducting signals across a device boundary.

Device 302, in some examples, may include range finder 332, which may be configured to determine a current interval at which to bias temperature sensor 306 when determining the temperature of temperature sensor 306. In some examples, the current interval determined by range finder 332 may represent a coarse quantization of the temperature of temperature sensor 306. For instance, range finder 332 may output a signal that indicates a particular range from a plurality of ranges that includes the current temperature of temperature sensor 306. For example, if the current, temperature of temperature sensor 306 is 87 degrees Celsius (188.6 degrees Fahrenheit) and the plurality of ranges includes a first range of −40-5 degrees Celsius (−40-23 degrees Fahrenheit), a second range of −20-30 degrees Celsius (−4-86 degrees Fahrenheit), a third range of 10-70 degrees Celsius (50-158 degrees Fahrenheit), and a fourth range of 50-110 degrees Celsius (122-230 degrees Fahrenheit), range finder 332 may output a signal the indicates that the temperature of temperature sensor 306 is in the second range. In some examples, the ranges may all be the same width. For instance, the ranges may all be X degrees wide. In some examples, the ranges may be different widths. For instance, a first range may be X degrees wide and a second range may be Y degrees wide. Further details of one example of range finder 332 are discussed below with reference to FIG. 4.

As discussed above, it may not be desirable to bias the temperature sensor at the same level when measuring temperatures across a wide range. In accordance with one or more techniques of this disclosure, to determine the temperature of temperature sensor 306, device 302 may perform a coarse quantization operation to determine a current level at which to bias temperature sensor 306 while determining the temperature of temperature sensor 306. In some examples, to perform the coarse quantization operation, device 302 may output a current to temperature sensor 306. For instance, controller 330 may output CURRENT_SOURCE_SEL such that one or more of current sources 328 is coupled to switches 342 and output Rtherm_SEL to cause switch 342B to couple the one or more current sources of current sources 328 to connector 314A (and cause switch 342A to decouple the one or more current sources of current sources 328 from multiplexor 336 and connector 314B). In this way, the one or more of current sources 328 may cause a current to flow through temperature sensor 306. The level of the current may be based on which current sources of current sources 328 are selected by controller 330 (i.e., which of current sources 328 are connected to switches 342 via switches 346).

The current flowing through temperature sensor 306 may cause temperature sensor 306 to generate a signal based on the temperature of temperature sensor 306. In particular, temperature sensor 306 may generate a voltage signal the voltage across temperature sensor 306, and thus the voltage across connectors 314A and 314C) based on the temperature of temperature sensor 306.

Device 302 may determine, based on the signal generated by temperature sensor 306, a coarse quantization of the temperature of temperature sensor 306. For instance, controller 330 may cause switch 340 to couple range finder 332 to connector 314A. Based on the voltage at connector 314A (i.e., the voltage across temperature sensor 306), range finder 332 may output a signal that indicates in which range from a plurality of ranges the temperature of temperature sensor 306 lies. For instance, if the current temperature of temperature sensor 306 is 87 degrees and the plurality of ranges includes a first range of 0-50 degrees, a second range of 50-100 degrees, a third range of 100-150 degrees, and a fourth range of 150-200 degrees, range finder 332 may output a signal to controller 330 the indicates that the temperature of temperature sensor 306 is in the second range. In this way, device 302 may determine a coarse quantization of the temperature of temperature sensor 306.

Device 302 may determine, based on the coarse quantization, a current level at which to bias temperature sensor 306 while determining the temperature of temperature sensor 306. For instance, controller 330 may determine a current level that may allow for the full utilization of the dynamic range of ADC 312. In particular, controller 330 may select a current level such that, if the temperature of temperature sensor 306 is at the low end of the range indicated by range finder 332 (the resistance of temperature sensor 306 has a negative temperature correlation or NTC), the resulting voltage across temperature sensor 306 is at the high end of values which may be quantized by ADC 312. As one example, if the dynamic range of ADC 312 (i.e., the range of values which may be quantized by ADC 312) is from 0 volts to 100 millivolts and the resistance of temperature sensor 306 at the low and high ends of the range indicated by range finder 332 are respectively 20 ohms and 6 ohms, controller 330 may determine to bias temperature sensor 306 at 0.005 amps. As such, if the temperature of temperature sensor 306 is at the low end of the range such that the resistance of temperature sensor 306 is 20 ohms, the resulting voltage across temperature sensor 306 would be 100 millivolts, which is at the high end of values which may be quantized by ADC 312. In some examples, the current levels may be predetermined. For instance, each range of the plurality of ranges may have a predetermined current level. In this way, device 302 may determine current level (i.e., $I_{int}$) at which to bias temperature sensor 306 while determining the temperature of temperature sensor 306.

As discussed above, it may be desirable for device 302 to determine the temperature of temperature sensor 306 without errors being introduced by bandgap reference 316. In accordance with one or more techniques of this disclosure, device 302 may utilize resistor 326 to reduce or eliminate error introduced by bandgap reference 316 when determining the temperature of temperature sensor 306. For instance, device 302 may obtain a first measurement based on the reference voltage output by BG reference 316 that indicates a voltage drop across resistor 326, obtain a second measurement also based on the reference voltage output by BG reference 316 that indicates a voltage drop across temperature sensor 306, and use the two measurements to cancel out the reference voltage output by BG reference 316.

To obtain the first measurement, controller 330 may cause switches 346 to selectively couple current sources 328 such that current sources 328 are outputting a fixed current (i.e., $I_{fix}$) to switches 342, cause switches 342 to direct the fixed current to connector 314B (which is connected to resistor 326), and cause multiplexor 336 and switch 338 to couple connector 314B to the input of ADC 312. Controller 330 may cause ADC 312 to perform the first measurement and generate a first value based on the reference voltage output by BG reference 316 and the voltage across resistor 326. In some examples, the first value generated by ADC 312 may represent the voltage across resistor 326 in accordance with Equation (2), below, where pi, is the first value, $I_{fix}$ is the current flowing through resistor 326, $R_{ref}$ is the resistance of resistor 326, and $V_{BG}$ is the reference voltage output by BG reference 316.

$$\mu_1 = \frac{I_{fix} * R_{ref}}{V_{BG}} \quad (2)$$

To obtain the second measurement, controller 330 may cause switches 346 to selectively couple current sources 328 such that current sources 328 are outputting the determined current to switches 342, cause switches 342 to direct the current to connector 314A (which is connected to temperature sensor 306), and cause multiplexor 336 and switch 338 to couple connector 314A to the input of ADC 312. Controller 330 may cause ADC 312 to perform the second measurement and generate a second value based on the reference voltage output by BG reference 316 and the voltage across temperature sensor 306. In some examples, the second value generated by ADC 312 may represent the voltage across temperature sensor 306 in accordance with Equation (3), below, where $\mu_2$ is the second value, $I_{int}$ is the current flowing through temperature sensor 306, N is the ratio of the current used to bias resistor 326 (i.e., $I_{fix}$) to the current used to bias temperature sensor 306 (i.e., $I_{int}$), $R_{temp}$ is the resistance of temperature sensor 306, and $V_{BG}$ is the reference voltage output by BG reference 316.

$$\mu_2 = \frac{N * I_{int} * R_{temp}}{V_{BG}} \quad (3)$$

Controller 330 may use the two measurements to cancel out the reference voltage output by BG reference 316. For instance, dividing Equation (3) by Equation (2) and rearranging the terms yields Equation (4). As such, controller 330 may plugin the first value, the second value, and the values of $R_{ref}$ and N into Equation (4) to determine the resistance of temperature sensor 306 without dependency on the reference voltage output by BG reference 316.

$$\frac{Eqn(4)}{Eqn(3)} \rightarrow R_{temp} = \frac{R_{ref} * \mu_2}{N * \mu_1} \quad (4)$$

Controller 330 may determine the temperature of temperature sensor 306 based on the determined resistance of temperature sensor 306. In some examples, controller 330 may utilize a LUT of LUTs 344 to convert the determined resistance of temperature sensor 306 into the temperature of temperature sensor 306. In some examples, controller 330 may use an estimated logarithmic mapping to convert the determined resistance of temperature sensor 306 into the temperature of temperature sensor 306.

As discussed above, in some examples, it may be desirable for a device to sense the temperature for N remote temperature sensors with fewer than 2N+1 connectors and to minimize the BOM for the system that includes the device. In accordance with one or more techniques of this disclosure, device 302 may be capable of sense the temperature for N remote sensing sites with N+2 connectors. For instance, as opposed to including a separate linearizing resistor for each remote temperature sensor, system 300 may include a single reference resistor, such as resistor 326, and device 302 may include a single additional connector for each additional remote temperature sensor. In other words, where system 300 includes three remote temperature sensors, device 302 may include five connectors 314 (as opposed to seven).

Figure 4:
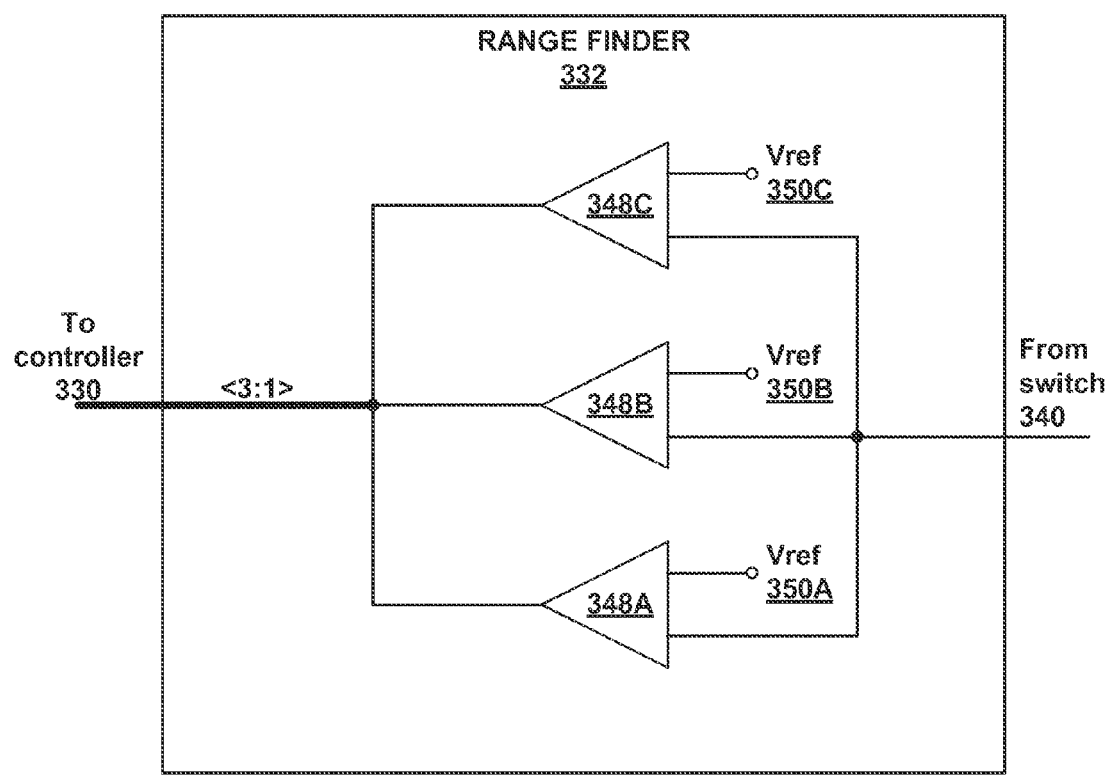
FIG. 4 is a schematic diagram of one example of a range finder, in accordance with one or more techniques of this disclosure.

FIG. 4 is a schematic diagram of one example of a range finder, in accordance with one or more techniques of this disclosure. As illustrated in FIG. 4, range finder 332 may include comparators 348A-348C (collectively, "comparators 348"). Additionally, as shown in FIG. 4, range finder 332 may receive a signal from switch 340 and output a signal to controller 330. Each of comparators 348 may be configured to compare the input signal received from switch 340 (i.e., the voltage across temperature sensor 306) with a respective reference voltage of reference voltages 350A-350C (collectively, "reference voltages 350"). While illustrated in the example of FIG. 4 as including three comparators, in other examples, range finder 332 may include any number of comparators (e.g., 1, 4, 10, or any number of suitable comparators).

As discussed above, range finder 332 may be configured to output a signal that indicates a range of a plurality of ranges in which the temperature of temperature sensor 306 currently resides. For instance, range finder 332 may output a signal that indicates whether the temperature of temperature sensor is within a first range, a second range, a third range, or a fourth range. Reference voltages 350 may be selected such that, when temperature sensor 306 is biased with a particular current, the voltage across temperature sensor 306 at the high end of each temperature range correspond to a reference voltage of reference voltages 350. For instance, reference voltage 350A may correspond to the voltage across temperature sensor 306 when the temperature of temperature sensor 306 is at the high end of the first range, reference voltage 350B may correspond to the voltage across temperature sensor 306 when the temperature of temperature sensor 306 is at the high end of the second range, and reference voltage 350C may correspond to the voltage across temperature sensor 306 when the temperature of temperature sensor 306 is at the high end of the third range. As such, if the temperature of temperature sensor 306 is within the third range, comparators 348A and 348B may output logical high signals and comparator 348C may output a logical low signal. In this way, range finder 332 may output a signal that indicates a range of a plurality of ranges in which the temperature of temperature sensor 306 currently resides.

Figure 5:
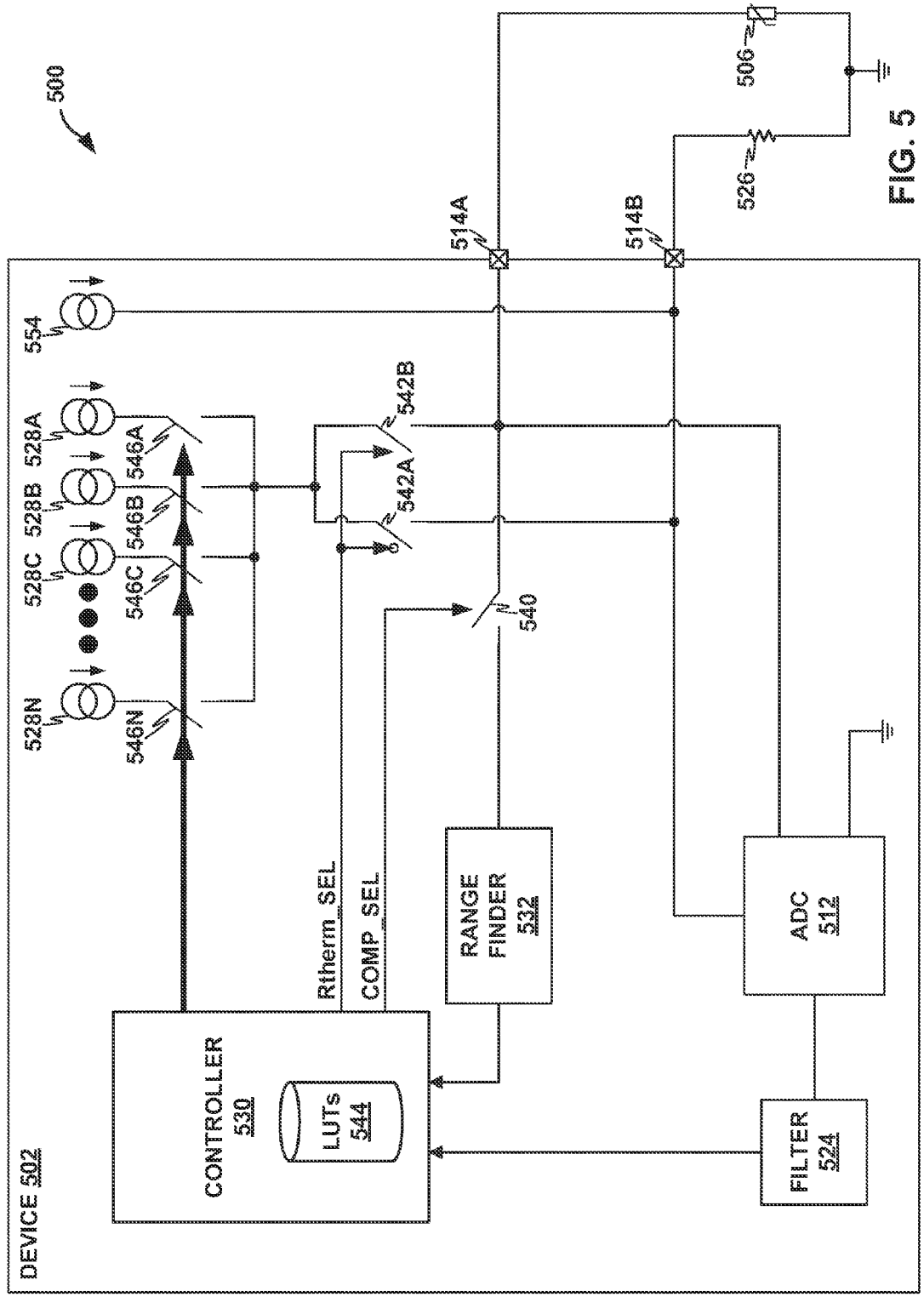
FIG. 5 is a conceptual diagram illustrating another exemplary system that includes a device for determining the temperature of a remote site, in accordance with one or more techniques of this disclosure.

FIG. 5 is a conceptual diagram illustrating another exemplary system that includes a device for determining the temperature of a remote site, in accordance with one or more techniques of this disclosure. As illustrated in the example of FIG. 5, system 500 may include device 502, resistor 526, and temperature sensor 506.

System 500 may include device 502 which may be configured to perform operations similar to device 302 of FIG. 3. For instance, device 502 may be configured to generate a digital value that represents a temperature of temperature sensor 506. As illustrated in the example of FIG. 5, device 502 may include analog-to-digital converter 512, connectors 514A-514B (collectively, "connectors 514"), filter 524, current sources 528A-3528N (collectively, "current sources 528"), controller 530, range finder 532, switch 540, switches 542A and 542B (collectively, "switches 542"), and current source 554. Switch 540, range finder 532, switches 542, filter 524, and connectors 514 may be configured to perform operations similar to switch 340, range finder 332 switches 342, filter 324, and connectors 314 of FIG. 3.

In some examples, device 502 may include current source 554 which may be configured to output a current ($I_{ref}$) to bias resistor 526. As such, as opposed to biasing an external reference resistor with current generated by current sources 528, device 502 may include dedicated current source 554 to bias reference resistor 526. As shown in FIG. 5, as opposed to using a reference voltage generator, such as BG reference 316 of FIG. 3, device 502 may use the resulting voltage across reference resistor 526 as the reference voltage for ADC 512.

In some examples, as opposed to biasing temperature sensor 506 with a static current, current sources 528 may be configured to bias temperature sensor 506 with a pulsed current. By biasing temperature sensor 506 with a pulsed current, device 502 may omit a pad which would otherwise be used to sense the ground on system 500 (i.e., the ground on an application board). In some examples, device 502 may measure the differential voltage with respect to the ground on system 500 using a time multiplexed scheme. For instance, during a first time interval when device 502 is not biasing temperature sensor 506 with a current (i.e., during a valley of the pulsed current), device 502 may measure the voltage at connector 514A and utilize the resulting measurement as the ground voltage. In this way, device 502 may reduce or remove error if there is high current following in ground on system 500.

In operation, device 502 may perform a coarse quantization operation to determine a current level at which to bias temperature sensor 506 while determining the temperature of temperature sensor 506. In some examples, device 502 may perform the coarse quantization using techniques similar to device 302 of FIG. 3. For instance, device 502 may output a first current through temperature sensor 506 and determine, based on the resulting voltage drop across temperature sensor 506 while the first current is flowing through temperature sensor 506, a current level (i.e., $I_{int}$) at which to bias temperature sensor 506 while determining the temperature of temperature sensor 506.

Device 502 may then determine the temperature of temperature sensor 506 using the determined biasing current. For instance, current sources 528 may output a second current at determined current level to temperature sensor 506 to generate a voltage drop across temperature sensor 506 that corresponds to the temperature of temperature sensor 506. While current sources 528 are outputting the current to temperature sensor 506, current source 554 may output a third current (i.e., $I_{ref}$) to bias resistor 526 which may generate a voltage drop across temperature sensor 506 that corresponds to the resistance of resistor 526 ($R_{ref}$).

ADC 512 may generate, using the voltage across resistor 526 as a reference, a value that corresponds to the temperature of temperature sensor 506. In some examples, the value generated by ADC 512 may represent the temperature of temperature sensor 506 in accordance with Equation (5), below, where $R_{temp}$ is the resistance of temperature sensor 506, $R_{ref}$ is the resistance of resistor 526, $I_{ref}$ is the third current flowing through resistor 526, μ is the value generated by ADC 512, and is the second current flowing through temperature sensor 506.

$$R_{temp} = \frac{R_{ref} * I_{ref} * \mu}{I_{int}} \quad (5)$$

Controller 530 may determine the temperature of temperature sensor 506 based on the determined resistance of temperature sensor 506. In some examples, controller 530 may utilize a LUT of LUTs 544 to convert the determined resistance of temperature sensor 506 into the temperature of temperature sensor 506. In some examples, controller 530 may use an estimated logarithmic mapping to convert the determined resistance of temperature sensor 506 into the temperature of temperature sensor 306.

In some examples, the temperature measurement process may be simplified though selection of $I_{ref}$ and $I_{int}$. For instance, if $I_{int}$ is selected to be $N*I_{ref}$, Equation (5) may be simplified into Equation (6), below.

$$R_{temp} = \frac{R_{ref} * \mu}{N} \quad (6)$$

In this way, the number of steps for each temperature sensor conversion can be reduced from three to two. In addition to this, the post mathematical manipulation can also be simplified. This is because only the interval check (i.e., range finding) may be performed and the first and second SD ADC conversion via the reference resistor and temperature sensor respectively may be combined into one. Additionally, an additional pad for sensing the application board ground may not be necessary with a pulsed output current (used to bias the temperature sensor) sourcing with a multiplexed sensing technique. When current sources 528 are turned on, the voltage across temperature sensor 506 may be sampled into the input capacitors of ADC 512. On the other hand, when current sources 528 are off, the application board ground voltage may be measured. The input sampling capacitors of the frontend of ADC 512 can then perform a difference.

Figure 6:
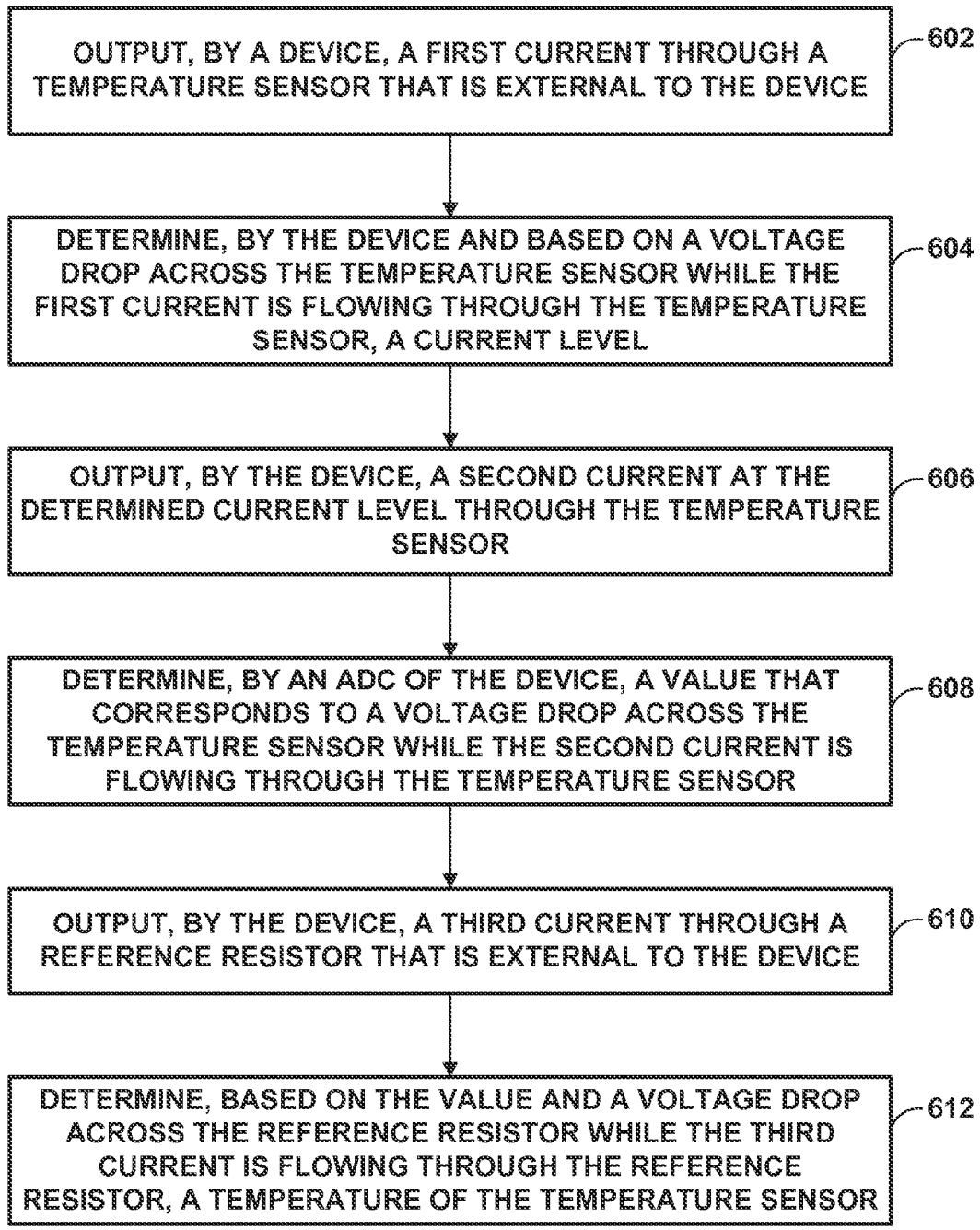
FIG. 6 is a flowchart illustrating example operations of a device configured to determine the temperature of a remote temperature sensor, in accordance with one or more techniques of this disclosure.

FIG. 6 is a flowchart illustrating example operations of a device configured to determine the temperature of a remote temperature sensor, in accordance with one or more techniques of this disclosure. For purposes of illustration only, the example operations are described below within the context of devices 302 of FIG. 3 and 502 of FIG. 5, though devices having configurations different than device 302 and device 502 may perform the operations of FIG. 6.

In accordance with one or more techniques of this disclosure, a device may output a first current through a temperature sensor that is external to the device (602). As one example, one or more of current sources 328 of device 302 may output a first current to temperature sensor 306 of FIG. 3. As another example, one or more of current sources 528 of device 502 may output a first current to temperature sensor 506 of FIG. 5.

The device may determine, based on a voltage drop across the temperature sensor while the first current is flowing through the temperature sensor, a current level (604). As one example, controller 330 and/or range finder 332 of device 302 may perform a coarse quantization to determine a current level at which to bias temperature sensor 306 while determining the temperature of temperature sensor 306. As another example, controller 530 and/or range finder 532 of device 502 may perform a coarse quantization to determine a current level at which to bias temperature sensor 506 while determining the temperature of temperature sensor 506.

The device may output a second current at, the determined current level through the temperature sensor (606). As one example, one or more of current sources 328 of device 302 may output a second current to temperature sensor 306 at the determined current level. As another example, one or more of current sources 528 of device 502 may output a second current to temperature sensor 506 at the determined current level.

An analog-to-digital (ADC) of the device may determine a value that corresponds to a voltage drop across the temperature sensor while the second current is flowing through the temperature sensor (608), the device may output a third current through a reference resistor that is external to the device (610), and the device may determine, based on the value and a voltage drop across the reference resistor while the third current is flowing through the reference resistor, a temperature of the temperature sensor (612).

As one example, ADC 312 of device 302 may perform a first measurement to generate a first value that corresponds to a voltage drop across temperature sensor 306 while the second current is flowing through temperature sensor 306, current 328 of device 302 may output a third current (i.e., $I_{fix}$ through resistor 326, and ADC 312 may perform a second measurement to generate a second value that corresponds to the voltage across temperature sensor 306. As discussed above, device 302 may then determine the temperature of temperature sensor 306 based on the first value and the second value (e.g., in accordance with Equation (4)). In this way, device 302 may determine the temperature of an external temperature sensor.

As another example, current source 554 may output a third current (e.g., $I_{ref}$) through resistor 526, and ADC 512 of device 502 may perform a measurement, using the voltage drop across resistor 526 as a reference voltage, to generate a value that corresponds to the voltage across temperature sensor 306. As discussed above, device 502 may then determine the temperature of temperature sensor 506 based on the value (e.g., in accordance with Equation (5)), which itself is already based on the voltage drop across resistor 526. In this way, device 502 may determine the temperature of an external temperature sensor.

In some examples, the device may perform additional operations not illustrated in FIG. 6. As one example, prior to determining the current level, the device may determine whether one or more fault conditions have occurred. For instance, the device may output one or more currents to the remote temperature sensor to check for any fault conditions. In some examples, the fault conditions may be defined to be either a short or open connection. As a result of the high dynamic range in the resistance of the temperature sensor across the operational temperature, there may a need to use two currents to check for this two fault conditions. In some examples, the device may output a larger current to check for a short condition and a smaller current to check for an open condition. The voltages generated may be channeled to a range finder, such as range finder 332 or 532. In some examples, the presence of any fault condition may halt the sensing protocol.

Figure 7:
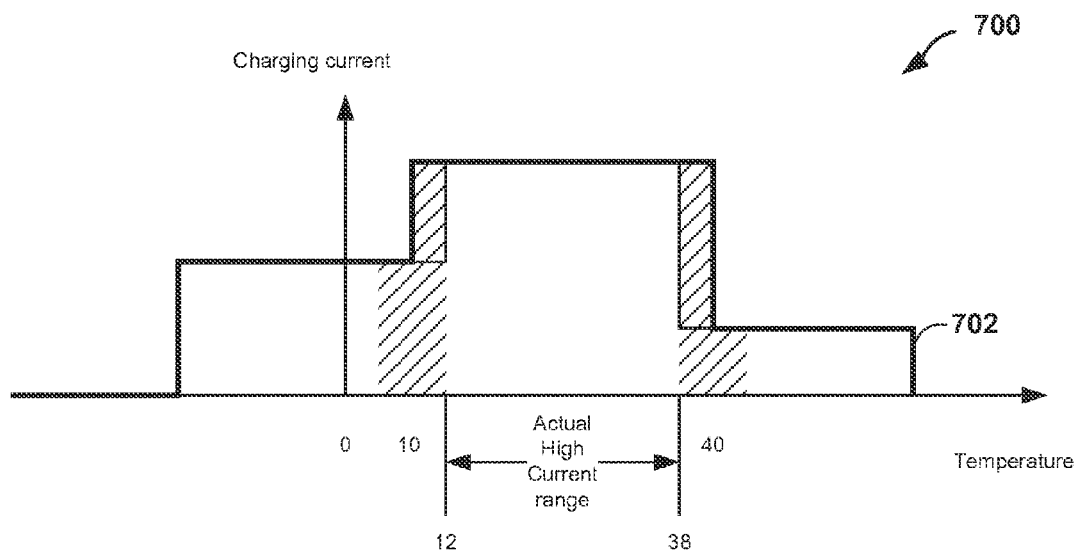
FIG. 7 is a graph illustrating an exemplary relationship between charging current and temperature of a battery, in accordance with one or more techniques of this disclosure.

FIG. 7 is a graph illustrating an example relationship between charging current and temperature of a battery, in accordance with one or more techniques of this disclosure. As illustrated by FIG. 7, graph 700 includes a horizontal axis that indicates a temperature of an example battery a vertical axis that indicates a charging current of the battery, and plot 702 that indicates a maximum allowable charging current of the battery. In some examples, an error may be introduced when measuring the temperature of the battery. For instance, the temperature of the battery may be determined with +/−2 degrees Celsius accuracy. As such, if the determined temperature of the battery is 40 degrees Celsius, the actual temperature of the battery may be between 38 and 42 degrees Celsius. As illustrated by plot 702, the maximum charging current of the battery may vary based on the determined temperature. In some examples, in order to comply with the temperature based maximum charging current, the battery may only be charged based on the "worst case" temperature. For instance, if the determined temperature of the battery is 40 degrees Celsius with +/−2 degrees Celsius accuracy, the maximum charging current for the battery may be determined as if the temperature of the battery is 38 degrees Celsius.

As discussed above, a device (e.g., device 302 of FIG. 3 or device 502 of FIG. 5) may measure a temperature of a remote temperature sensor. For instance, device 302 may utilize temperature sensor 306 to measure the temperature of a battery. In accordance with one or more techniques of this disclosure, the device may reduce the error introduced when measuring the temperature of the battery. In this way, the device may improve the accuracy of the measured temperature of the battery such that the "worst case" temperature is not as low, which may allow charging of the battery at an increased current level. In this way, the device may reduce the amount of time needed to charge the battery.

Figure 8:
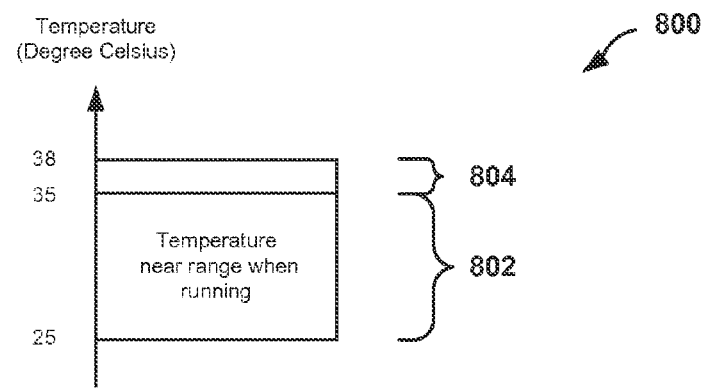
FIG. 8 is a graph illustrating exemplary temperature levels of a battery, in accordance with one or more techniques of this disclosure.

FIG. 8 is a graph illustrating example temperature levels of a battery, in accordance with one or more techniques of this disclosure. As illustrated by FIG. 8, graph 800 includes a vertical axis that indicates a temperature of a battery. As shown by graph 800, when a device is running/operating (e.g., drawing current from the battery), the determined temperature of the battery may be within range 802 (e.g., from approximately room temperature 25 degrees Celsius to approximately 35 degrees Celsius). However, in some examples, when the battery is charging, the temperature of the battery may rise above range 802 and enter range 804 (e.g., from approximately 35 degrees Celsius to 38 degrees Celsius).

The following numbered examples may illustrate one or more aspects of the disclosure:

Example 1

A method comprising: outputting, by a device, a first current through a temperature sensor that is that is external to the device; determining, by the device and based on a voltage drop across the temperature sensor while the first current is flowing through the temperature sensor, a current level; outputting, by the device, a second current at the determined current level through the temperature sensor; determining, by an analog-to-digital converter (ADC) of the device, a value that corresponds to a voltage drop across the temperature sensor while the second current is flowing through the temperature sensor; outputting, by the device, a third current through a reference resistor that is external to the device; and determining, based on the value and a voltage drop across the reference resistor while the third current is flowing through the reference resistor, a temperature of the temperature sensor.

Example 2

The method of example 1, wherein the ADC uses the voltage drop across the reference resistor while the third current is flowing through the reference resistor as a reference voltage when determining the value that corresponds to the voltage drop across the temperature sensor while the second current is flowing through the temperature sensor.

Example 3

The method of any combination of examples 1-2, wherein the value that corresponds to a voltage drop across the temperature sensor while the second current is flowing through the temperature sensor is a first value, the method further comprising: determining, by the ADC, a second value that corresponds to the voltage drop across the reference resistor while the third current is flowing through the reference resistor, wherein the temperature of the temperature sensor is determined based on the first value and the second value.

Example 4

The method of any combination of examples 1-3, wherein determining the current level comprises: selecting, based on the voltage drop across the temperature sensor while the first current is flowing through the temperature sensor, the current level from a plurality of predetermined current levels that correspond to temperature ranges.

Example 5

The method of any combination of examples 1-4, wherein determining the temperature of the temperature sensor comprises; determining, by the device, respective temperatures of a plurality of temperature sensors based on the voltage drop across the reference resistor while the third current is flowing through the reference resistor.

Example 6

The method of any combination of examples 1-5, wherein the temperature sensor comprises a thermistor.

Example 7

A device comprising: one or more current sources; an analog-to-digital converter (ADC); and a controller configured to: cause the one or more current sources to output a first current through a temperature sensor that is external to the device; determine, based on a voltage drop across the temperature sensor while the first current is flowing through the temperature sensor, a current level; cause the one or more current sources to output a second current at the determined current level through the temperature sensor; cause the ADC to generate a value that corresponds to a voltage drop across the temperature sensor while the second current is flowing through the temperature sensor; cause the one or more current sources to output a third current through a reference resistor that is external to the device; and determine, based on the value and a voltage drop across the reference resistor while the third current is flowing through the reference resistor, a temperature of the temperature sensor.

Example 8

The device of example 7, wherein the ADC is configured to use the voltage drop across the reference resistor while the third current is flowing through the reference resistor as a reference voltage when generating the value that corresponds to the voltage drop across the temperature sensor while the second current is flowing through the temperature sensor.

Example 9

The device of any combination of examples 7-8, wherein the value that corresponds to a voltage drop across the temperature sensor while the second current is flowing through the temperature sensor is a first value, wherein the controller is further configured to cause the ADC to generate a second value that corresponds to the voltage drop across the reference resistor while the third current is flowing through the reference resistor, and wherein the controller is configured to determine the temperature of the temperature sensor based on the first value and the second value.

Example 10

The device of any combination of examples 7-9, wherein, to determine the current level, the controller is configured to: select, based on the voltage drop across the temperature sensor while the first current is flowing through the temperature sensor, the current level from a plurality of predetermined current levels that correspond to temperature ranges.

Example 11

The device of any combination of examples 7-10, wherein the controller is further configured to: determine respective temperatures of a plurality of temperature sensors based on the voltage drop across the reference resistor while the third current is flowing through the reference resistor.

Example 12

The device of any combination of examples 7-11, wherein the temperature sensor comprises a thermistor.

Example 13

A system comprising: a temperature sensor; a reference resistor; and a device comprising: one or more current sources configured to output a first current through the temperature sensor; a controller configured to determine, based on a voltage drop across the temperature sensor while the first current is flowing through the temperature sensor, a current level, wherein the one or more current sources are further configured to output a second current at the determined current level through the temperature sensor; and an analog-to-digital converter (ADC) configured to determine a value that corresponds to a voltage drop across the temperature sensor while the second current is flowing through the temperature sensor, wherein the one or more current sources are further configured to output a third current through the reference resistor, and wherein the controller is further configured to determine, based on the value and a voltage drop across the reference resistor while the third current is flowing through the reference resistor, a temperature of the temperature sensor.

Example 14

The system of example 13, wherein the ADC is configured to use the voltage drop across the reference resistor while the third current is flowing through the reference resistor as a reference voltage when determining the value that corresponds to the voltage drop across the temperature sensor while the second current is flowing through the temperature sensor.

Example 15

The system of any combination of examples 13-14, wherein the value that corresponds to a voltage drop across the temperature sensor while the second current is flowing through the temperature sensor is a first value, wherein the ADC is further configured to generate a second value that corresponds to the voltage drop across the reference resistor while the third current is flowing through the reference resistor, and wherein the controller is configured to determine the temperature of the temperature sensor based on the first value and the second value.

Example 16

The system of any combination of examples 13-15, wherein, to determine the current level, the controller is configured to: select, based on the voltage drop across the temperature sensor while the first current is flowing through the temperature sensor, the current level from a plurality of predetermined current levels that correspond to temperature ranges.

Example 17

The system of any combination of examples 13-16, further comprising: a plurality of temperature sensors, wherein the controller is further configured to determine respective temperatures of a plurality of temperature sensors based on the voltage drop across the reference resistor while the third current is flowing through the reference resistor.

Example 18

The system of any combination of examples 13-17, wherein the temperature sensor comprises a thermistor.

Example 19

A device comprising: means for outputting a first current through a temperature sensor that is that is external to the device; means for determining, based on a voltage drop across the temperature sensor while the first current is flowing through the temperature sensor, a current level; means for outputting a second current at the determined current level through the temperature sensor; means for determining a value that corresponds to a voltage drop across the temperature sensor while the second current is flowing through the temperature sensor; means for outputting a third current through a reference resistor that is external to the device; and means for determining, based on the value and a voltage drop across the reference resistor while the third current is flowing through the reference resistor, a temperature of the temperature sensor The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:
   outputting, by a device, a first current through a temperature sensor that is external to the device;
   determining, by the device and based on a voltage drop across the temperature sensor while the first current is flowing through the temperature sensor, a current level;
   outputting, by the device, a second current at the determined current level through the temperature sensor;
   determining, by an analog-to-digital converter (ADC) of the device, a value that corresponds to a voltage drop across the temperature sensor while the second current is flowing through the temperature sensor;
   outputting, by the device, a third current through a reference resistor that is external to the device; and
   determining, based on the value and a voltage drop across the reference resistor while the third current is flowing through the reference resistor, a temperature of the temperature sensor.

2. The method of claim 1, wherein the ADC uses the voltage drop across the reference resistor while the third current is flowing through the reference resistor as a reference voltage when determining the value that corresponds to the voltage drop across the temperature sensor while the second current is flowing through the temperature sensor.

3. The method of claim 1, wherein the value that corresponds to a voltage drop across the temperature sensor while the second current is flowing through the temperature sensor is a first value, the method further comprising:
   determining, by the ADC, a second value that corresponds to the voltage drop across the reference resistor while the third current is flowing through the reference resistor,
   wherein the temperature of the temperature sensor is determined based on the first value and the second value.

4. The method of claim 1, wherein determining the current level comprises:
   selecting, based on the voltage drop across the temperature sensor while the first current is flowing through the temperature sensor, the current level from a plurality of predetermined current levels that correspond to temperature ranges.

5. The method of claim 1, wherein determining the temperature of the temperature sensor comprises:
   determining, by the device, respective temperatures of a plurality of temperature sensors based on the voltage drop across the reference resistor while the third current is flowing through the reference resistor.

6. The method of claim 1, wherein the temperature sensor comprises a thermistor.

7. A device comprising:
   one or more current sources;
   an analog-to-digital converter (ADC); and
   a controller configured to:
      cause the one or more current sources to output a first current through a temperature sensor that is external to the device;
      determine, based on a voltage drop across the temperature sensor while the first current is flowing through the temperature sensor, a current level;
      cause the one or more current sources to output a second current at the determined current level through the temperature sensor;
      cause the ADC to generate a value that corresponds to a voltage drop across the temperature sensor while the second current is flowing through the temperature sensor;
      cause the one or more current sources to output a third current through a reference resistor that is external to the device; and
      determine, based on the value and a voltage drop across the reference resistor while the third current is flowing through the reference resistor, a temperature of the temperature sensor.

8. The device of claim 7, wherein the ADC is configured to use the voltage drop across the reference resistor while the third current is flowing through the reference resistor as a reference voltage when generating the value that corresponds to the voltage drop across the temperature sensor while the second current is flowing through the temperature sensor.

9. The device of claim 7, wherein the value that corresponds to a voltage drop across the temperature sensor while the second current is flowing through the temperature sensor is a first value, wherein the controller is further configured to cause the ADC to generate a second value that corresponds to the voltage drop across the reference resistor while the third current is flowing through the reference resistor, and wherein the controller is configured to determine the temperature of the temperature sensor based on the first value and the second value.

10. The device of claim 7, wherein, to determine the current level, the controller is configured to:
   select, based on the voltage drop across the temperature sensor while the first current is flowing through the temperature sensor, the current level from a plurality of predetermined current levels that correspond to temperature ranges.

11. The device of claim 7, wherein the controller is further configured to:
determine respective temperatures of a plurality of temperature sensors based on the voltage drop across the reference resistor while the third current is flowing through the reference resistor.

12. The device of claim 7, wherein the temperature sensor comprises a thermistor.

13. A system comprising:
a temperature sensor;
a reference resistor; and
a device comprising:
  one or more current sources configured to output a first current through the temperature sensor;
  a controller configured to determine, based on a voltage drop across the temperature sensor while the first current is flowing through the temperature sensor, a current level, wherein the one or more current sources are further configured to output a second current at the determined current level through the temperature sensor; and
  an analog-to-digital converter (ADC) configured to determine a value that corresponds to a voltage drop across the temperature sensor while the second current is flowing through the temperature sensor, wherein the one or more current sources are further configured to output a third current through the reference resistor, and wherein the controller is further configured to determine, based on the value and a voltage drop across the reference resistor while the third current is flowing through the reference resistor, a temperature of the temperature sensor.

14. The system of claim 13, wherein the ADC is configured to use the voltage drop across the reference resistor while the third current is flowing through the reference resistor as a reference voltage when determining the value that corresponds to the voltage drop across the temperature sensor while the second current is flowing through the temperature sensor.

15. The system of claim 13, wherein the value that corresponds to a voltage drop across the temperature sensor while the second current is flowing through the temperature sensor is a first value, wherein the ADC is further configured to generate a second value that corresponds to the voltage drop across the reference resistor while the third current is flowing through the reference resistor, and wherein the controller is configured to determine the temperature of the temperature sensor based on the first value and the second value.

16. The system of claim 13, wherein, to determine the current level, the controller is configured to:
select, based on the voltage drop across the temperature sensor while the first current is flowing through the temperature sensor, the current level from a plurality of predetermined current levels that correspond to temperature ranges.

17. The system of claim 13, further comprising:
a plurality of temperature sensors, wherein the controller is further configured to determine respective temperatures of a plurality of temperature sensors based on the voltage drop across the reference resistor while the third current is flowing through the reference resistor.

18. The system of claim 13, wherein the temperature sensor comprises a thermistor.

19. A device comprising:
means for outputting a first current through a temperature sensor that is external to the device;
means for determining, based on a voltage drop across the temperature sensor while the first current is flowing through the temperature sensor, a current level;
means for outputting a second current at the determined current level through the temperature sensor;
means for determining a value that corresponds to a voltage drop across the temperature sensor while the second current is flowing through the temperature sensor;
means for outputting a third current through a reference resistor that is external to the device; and
means for determining, based on the value and a voltage drop across the reference resistor while the third current is flowing through the reference resistor, a temperature of the temperature sensor.

* * * * *